(12) United States Patent
Espinoza et al.

(10) Patent No.: US 7,183,327 B2
(45) Date of Patent: Feb. 27, 2007

(54) OPTIMIZED PARTICLE DISTRIBUTION FOR SLURRY BUBBLE COLUMN REACTORS

(75) Inventors: Rafael L. Espinoza, Ponca City, OK (US); Oluwaseyi A. Odueyungbo, Ponca City, OK (US); Jianping Zhang, Ponca City, OK (US); Sergio R. Mohedas, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 417 days.

(21) Appl. No.: 10/803,319

(22) Filed: Mar. 18, 2004

(65) Prior Publication Data

US 2005/0209350 A1    Sep. 22, 2005

(51) Int. Cl.
*C07C 27/00* (2006.01)
(52) U.S. Cl. ...................................................... 518/700
(58) Field of Classification Search ................ 518/700
See application file for complete search history.

(56) References Cited

U.S. PATENT DOCUMENTS

| | | |
|---|---|---|
| 5,157,054 A | 10/1992 | Herbolzheimer et al. |
| 5,348,982 A | 9/1994 | Herbolzheimer et al. ... 518/700 |
| 6,348,510 B1 | 2/2002 | Maretto et al. ............ 518/715 |
| 6,596,667 B2 | 7/2003 | Bellussi et al. |
| 2003/0114543 A1 | 6/2003 | Zhang et al. ............... 518/728 |
| 2003/0195264 A1 | 10/2003 | Newton et al. |
| 2004/0050806 A1 | 3/2004 | Espinoza et al. ........... 210/806 |

FOREIGN PATENT DOCUMENTS

EP    0 450 860 A2    3/1991

OTHER PUBLICATIONS

PCT International Preliminary Report on Patentability for International Application No. PCT/US05/05863 dated Sep. 19, 2006 (4 p.).
PCT Search Report for International Application No. PCT/US05/05863 dated Apr. 12, 2005 (2 p.).
Sie, S.T. & Krishna, R. (1999) "Fundamentals and selection of advanced Fischer-Tropsch reactors" Applied Catalysis A: General vol. 186, pp. 55-70 (16 p.).

*Primary Examiner*—J. Parsa
(74) *Attorney, Agent, or Firm*—Conley Rose P.C.

(57) ABSTRACT

A method for selecting maximum and minimum catalyst particle sizes for use in a multiphase reactor that reflects optimum operating conditions of the reactor is based on a maximum Archimedes number for estimating the maximum particle size and a property of a separation system linked to the reactor to determine the minimum particle size. The maximum Archimedes number could be selected based on a maximum catalyst non-uniformity in the reactor. Additionally, a method for producing hydrocarbons from syngas in a slurry bubble column reactor comprises the use of a plurality of fresh catalyst particles with an optimum size distribution based on a range of Archimedes numbers between about 0.02 and 250 or alternatively based on an average Reynolds number less than about 0.1.

24 Claims, 6 Drawing Sheets

OPTIMIZED PARTICLE DISTRIBUTION FOR SLURRY BUBBLE COLUMN REACTORS

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD OF THE INVENTION

The present invention relates to a process for the preparation of hydrocarbons from synthesis gas—i.e., a mixture of carbon monoxide and hydrogen—typically labeled the Fischer-Tropsch process. More particularly, this invention relates to a method that provides for optimum design and operation of slurry bubble column reactors in a Fischer-Tropsch process.

BACKGROUND

Large quantities of methane, the main component of natural gas, are available in many areas of the world, and natural gas is predicted to outlast oil reserves by a significant margin. However, most natural gas is situated in areas that are geographically remote from population and industrial centers. The costs of compression, transportation, and storage make its use economically unattractive. To improve the economics of natural gas use, much research has focused on the use of methane as a starting material for the production of higher hydrocarbons and hydrocarbon liquids, which are more easily transported and thus more economical. The conversion of methane to hydrocarbons is typically carried out in two steps. In the first step, methane is converted into a mixture of carbon monoxide and hydrogen (i.e., synthesis gas or syngas). In a second step, the syngas is converted into hydrocarbons. The term "hydrocarbon" as used in this specification encompasses not only molecules containing only hydrogen and carbon, but also molecules containing hydrogen, carbon, and other atoms, such as oxygen, sulfur, and nitrogen.

This second step, the preparation of hydrocarbons from synthesis gas, is well known in the art and is usually referred to as Fischer-Tropsch synthesis, the Fischer-Tropsch process, or Fischer-Tropsch reaction(s). Fischer-Tropsch synthesis generally entails contacting a stream of synthesis gas with a catalyst under temperature and pressure conditions that allow the synthesis gas to react and form hydrocarbons. More specifically, the Fischer-Tropsch reaction is the catalytic hydrogenation of carbon monoxide to produce any of a variety of products ranging from methane to higher alkanes and aliphatic alcohols. Research continues on the development of more efficient Fischer-Tropsch catalyst systems and reaction systems that increase the selectivity for high-value hydrocarbons in the Fischer-Tropsch product stream.

Originally, the Fischer-Tropsch synthesis was carried out in packed bed reactors. These reactors have several drawbacks, such as temperature control, that can be overcome by gas-agitated slurry reactors. Gas-agitated multiphase reactors, sometimes called "slurry reactors," "slurry bubble reactors," or "slurry bubble column reactors" operate by suspending catalytic particles in liquid and passing a feed stream of gas reactants into the bottom of the reactor through a gas distributor, which produces small gas bubbles. As the gas bubbles rise through the reactor, the reactants are absorbed into the liquid and diffuse to the catalyst where, depending on the catalyst system, they are typically converted to gaseous and liquid products. The gaseous products formed enter the gas bubbles and are collected at the top of the reactor. Liquid products are recovered from the slurry by using different techniques like filtration, settling, hydrocyclones, magnetic techniques, etc. Gas-agitated multiphase reactors or slurry bubble column reactors (SBCRs) inherently have very high heat transfer rates; therefore, reduced reactor cost and the ability to remove and add catalyst online are principal advantages of such reactors in Fischer-Tropsch synthesis, which is exothermic. Sie and Krishna (Appl. Catalysis A: General 1999, 186, p. 55) give a history of the development of various Fischer-Tropsch reactors and the advantages of slurry bubble columns over fixed bed reactors.

Heretofore, it has been common to provide relatively large catalyst particles, e.g. particles having a Reynolds number greater than 0.1, particularly because larger particles facilitate filtration. However, because larger particles tend to settle faster than smaller particles, it is more difficult to provide a fluidized bed, with the result that the gas and liquid flow parameters are constrained. In slurry bubble column reactors where plug flow is desired, this results in a narrow window for the gas flow because it must be sufficient to generate enough liquid turbulence to distribute the catalyst particles but not so high that it results in a well-mixed flow regime.

U.S. Pat. No. 5,348,982, which is the same disclosure as EP 0450860 A2, describes a method for operating a slurry bubble column reactor to maintain plug flow over the column length. The application discloses converting catalyst particles to a desired particle size range, if necessary, of nominally 1–200 microns average diameter. The methods disclosed for this conversion include crushing or ultrasonic treatment. The disclosure teaches that the material may then be sieved, if necessary, to produce a powder that is predominantly within the desired particle size range. The disclosure teaches that catalyst particles below 5 microns should be avoided and that a more preferred diameter is greater than 30 microns.

U.S. Pat. No. 6,348,510 discloses an optimized process for producing heavy hydrocarbons according to the Fischer-Tropsch method. The method requires that solid catalyst particles have a Reynolds number greater than 0.1. According to the examples cited in the disclosure, a Reynolds number greater than 0.1 may require particle sizes greater than 38–60 microns depending on various properties of the suspending liquid and the catalyst particles themselves. This requirement is tied to improving the efficiency of the separation of the liquid phase from the solid catalyst particles. The disclosure defines Reynolds number in terms of average particle diameter, which is not defined.

Such large particles are disadvantageous when used with the present catalysts because the activity of the present catalysts is such that their placement on large-diameter particles results in a reduction in the overall use of the catalyst. More specifically, when the size of a catalyst particle having a given activity is increased, it will reach a size beyond which the catalytic sites will not be wholly utilized because the diameter of the particle will prevent reactants from reaching catalytic sites in the interior of the particle. Thus, a better range of catalyst particle sizes and a better system for characterizing optimum catalyst particle size are necessary. Moreover, a better method for choosing particle size ranges that reflects actual operating conditions is necessary.

SUMMARY OF THE INVENTION

A preferred embodiment of the present invention provides a method for selecting a maximum size for catalyst particles in a multiphase reactor. The multiphase reactor may include a liquid with catalyst particles dispersed in the liquid. The method comprises selecting a catalyst non-uniformity for the multiphase reactor, determining an Archimedes number that corresponds to the selected catalyst non-uniformity, and calculating a maximum catalyst diameter from the Archimedes number according to the equation $$d'_P = \sqrt[3]{\frac{Ar\mu_L^2}{g\rho_L(\rho_p - \rho_L)}}.$$

Additionally, a minimum catalyst diameter may be selected based on minimum particle settling velocity, filter permeability, or other separation characteristics.

In another embodiment, the present invention provides a method for producing hydrocarbons from synthesis gas in a multiphase reactor. The method includes passing a synthesis gas feed stream over a catalyst in the multiphase reactor under reaction promoting conditions. The catalyst comprises both fresh catalyst particles and particles that may be partially or wholly deactivated and/or attritted. The method further includes selecting fresh catalyst particles to have Archimedes numbers between about 0.02 and about 250, between about 0.02 and about 100, or between about 0.2 and about 30. Additionally, a majority of the catalyst particles may have particle sizes between about 10 and about 250 microns and may have an average Reynolds number of less than about 0.1 according to the equation $$Re_{avg} = \sum_{i=1}^{M} f_i Re_i,$$

where $f_i$ is the portion of particles in particle size fraction i, which is determined by dividing the number of particles in size fraction i by the total number of particles, which is N, and $Re_i$ is the Reynolds number of particles of size fraction i. The method may include using a solid particulate catalyst such that the particle Reynolds number is less than 0.1, more preferably about 0.05–0.06, and such that the catalyst particles are predominantly in the range of about 10–250 microns, more preferably about 10–200 microns, and most preferably about 20–150 microns. Additionally, the method may include having a catalyst wherein the number average particle size is between about 20 and about 50 microns, preferably between about 30 and about 40 microns.

BRIEF DESCRIPTION OF THE DRAWINGS

For a detailed description of the preferred embodiments of the present invention, reference will now be made to the accompanying Figures, wherein.

DETAILED DESCRIPTION OF PREFERRED EMBODIMENTS

While much of the prior art has focused on maintaining catalyst particles in slurry bubble column reactors within a certain particle size range, the present invention provides more effective criteria for optimizing catalyst particle size for a given catalyst separation system, catalyst activity, and set of reactor operating conditions. In a preferred embodiment, the present invention provides a method for optimizing the operation of a slurry bubble column reactor. The method includes use of the dimensionless Archimedes number to calculate an optimum particle size range in a slurry bubble column reactor.

One preferred embodiment of the present invention is the Fischer-Tropsch synthesis of hydrocarbons using catalysts comprising a catalytically active metal, such as cobalt, iron, or ruthenium. The catalysts may contain a support, such as alumina, titania, zirconia, silica, or combinations thereof. Additionally, the catalyst may contain one or more promoters, comprising Group 1, 2, 3, 4, 5, 7, 8, 9, 10, 11, and 13 metals. The catalyst may contain about 1% to 100% catalytically active metal when the catalytically active metal is iron or cobalt. Alternatively, the catalyst may contain about 0.5% to 10% catalytically active metal when the catalytically active metal is ruthenium. The preferred catalytic metal is cobalt, and preferred supports are stabilized alumina and silica-alumina. Preferred promoters for cobalt are boron, platinum, palladium, silver, ruthenium, and rhenium. Preferred promoters for iron are lithium, potassium, copper, and silver.

Cobalt catalysts have a high activity and selectivity for the Fischer-Tropsch synthesis. The kinetic expression given by Yates and Satterfield (Energy and Fuels, (1991) 5, 168–173) can be used to evaluate the performance of slurry bed reactors using cobalt catalysts when combined with the hydrodynamics and mass transfer predictions. The Fischer-Tropsch process is typically run in a continuous mode. In this mode, the gas hourly space velocity through the reaction zone may range from about 50 to about 10,000 hr$^{-1}$, preferably from about 300 hr$^{-1}$ to about 2,000 hr$^{-1}$. The reaction zone temperature may range from about 160° C. to about 300° C. Preferably, the reaction zone is operated at conversion promoting conditions at temperatures from about 190° C. to about 260° C. The reaction zone pressure may range from about 80 psia (552 kPa) to about 1,000 psia (6,895 kPa), more preferably from about 80 psia (552 kPa) to about 600 psia (4,137 kPa), and most preferably from about 140 psia (965 kPa) to about 500 psia (3,447 kPa). While these conditions should not be considered limiting, they are considered to be the normal operating ranges for Fischer-Tropsch synthesis.

U.S. patent application Ser. No. 10/023,258, entitled "Slurry Bubble Reactor Operated in Well-Mixed Gas Flow Regime," now issued as U.S. Pat. No. 6,914,082, discloses a preferred operation for slurry bubble columns for use in Fischer-Tropsch synthesis. That application is incorporated by reference herein in its entirety. The application teaches that a maximum reactor productivity—or a minimum reactor volume—can be achieved by operating a multi-phase reactor to be in the well-mixed gas flow regime, with a gas Peclet number less than 0.175, more preferably less than 0.15, and a single pass conversion ranging from 35% to 75%, wherein the inlet superficial gas velocity decreases with the decreasing of the reactor aspect ratio (ie., L/D ratio), and is preferably at least 20 cm/sec Thus, for embodiments of the present invention involving Fischer-Tropsch synthesis, the reactor operation is preferably in the well-mixed gas flow regime. However, operating in this gas flow regime is not necessary to the present invention. Further, while the Fischer-Tropsch synthesis is a preferred embodiment of the present invention, other reactions carried out in slurry bubble column reactors may also benefit from the present invention.

Catalyst/Product Separation

Referring again to catalysts for use in slurry bubble column reactors, the catalyst is preferably supported on a particulate support, or formed as a particulate, such that the catalyst particles have a known or predetermined average size. While particles of virtually any size may be theoretically effective, it is desirable to avoid using particles of the smallest sizes, as very small particles impact the effectiveness of the downstream catalyst/product separation system discussed below. In slurry bubble column reactor operation, the catalyst particles are combined with a liquid phase to form a slurry, which is maintained in the slurry bubble column reactor. For example, in the preferred embodiment of Fischer-Tropsch synthesis, the liquid phase is a mixture of hydrocarbons, including molecules containing carbon, hydrogen, and other atoms such as oxygen. A vapor stream may be bubbled through the slurry to generate mixing and vapor contact with the catalyst.

As the Fischer-Tropsch reaction is carried out inside the slurry bubble column reactor, hydrocarbons of various molecular weights are formed, and many are sufficiently large to remain in the liquid phase—i.e., they are not vaporized under reaction conditions. Thus, while the reaction is occurring, liquid products may be produced that ultimately must be recovered. To recover the liquid products, a portion of the slurry may be removed from the reactor, and the catalyst particles suspended in the slurry may be removed from the slurry in a number of ways, such as sedimentation or filtration. Recovering the catalyst particles and returning them to the reactor are preferred to maintain the catalyst concentration inside the reactor without continuously replacing the catalyst with fresh catalyst, which, though technically feasible, would be quite expensive.

One problem with particles of the smallest sizes is that they are difficult to separate from the slurry comprising liquid products. In particular, it is more difficult to separate these very small catalyst particles from the slurry because standard catalyst/product separation systems, such as centrifuges or filters, are less effective on particles smaller than about 10–20 microns. Thus, these particles should be removed from any fresh catalyst and are preferably removed from the slurry while the reactor is operating.

Figure 1:
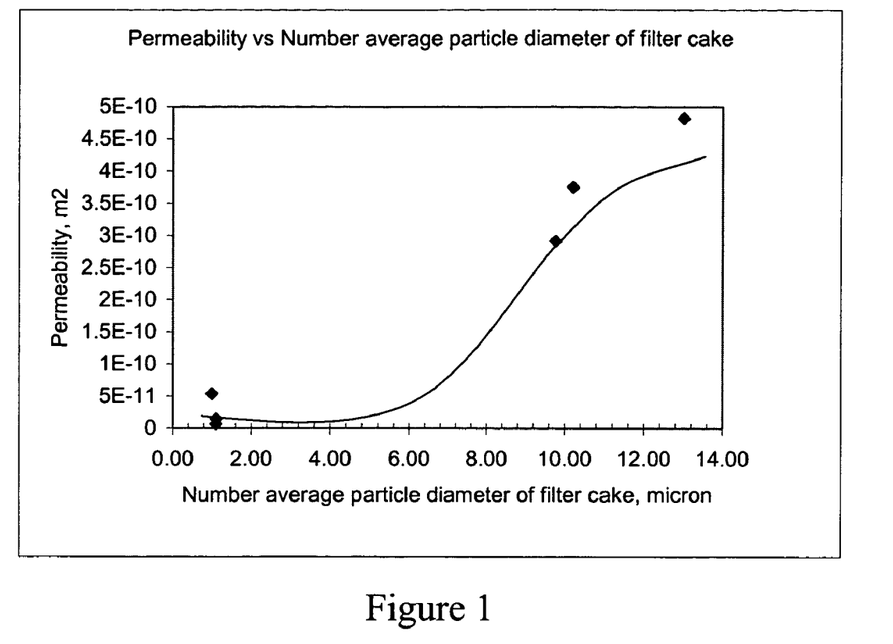
FIG. 1 is a plot illustrating the permeability versus number average particle diameter of filter cake.

As shown in FIG. 1, the permeability of a cross-flow filter comprising a Fischer-Tropsch catalyst cake is greatly affected by the number average particle diameter. Permeability decreases as the average size of the particles in the cake becomes smaller. Initially, permeability decreases steadily with average particle diameter above about 10 microns; however, permeability then drops rapidly to a very low value and remains almost steady for average particle diameter up to about 6 microns. The characteristics of the plot are governed by the migration of very small particles into the fluid path within the cake and, ultimately, reduction of cake permeability. The minimum number average particle size acceptable for filtration therefore corresponds to a size for which the filter cake permeability begins a drastic decline (i.e., about 10 microns). From FIG. 1, this minimum average particle size acceptable for filtration in a Fischer-Tropsch application corresponds to an average number average particle diameter of about 9 to about 10.5 microns. FIG. 1 also establishes that the presence of particles with sizes of about 5 microns and below should be avoided to prevent loss of filter cake permeability, and if they are generated by the system, they should be removed on a continual basis, if filters are employed for liquid products recovery. Thus, filtration would be increasingly difficult as the number average particle size decreases, particularly when the particle size is below about 10 microns.

Figure 2:
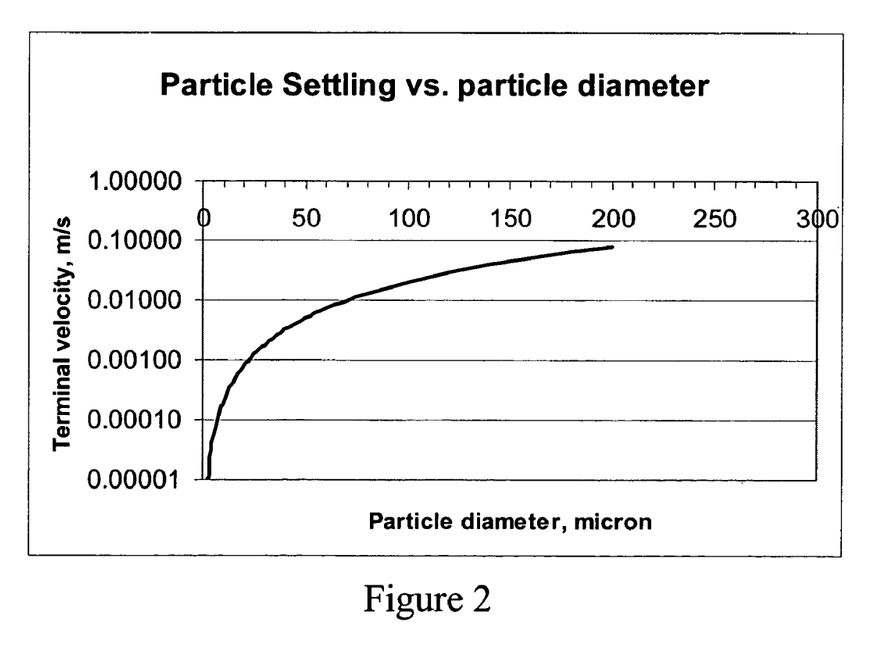
FIG. 2 is a plot illustrating the particle terminal velocity versus the particle diameter.

A catalyst/product separation system based on sedimentation would also have a lower performance in the presence of very small particles. FIG. 2 shows a plot of the terminal velocity of particles (unhindered settling) as a function of particle diameter. The terminal velocity decreases with decreasing particle size. A steeper decline in terminal velocity occurs at particle sizes of about 30 microns and below. Below particle sizes of about 30 microns, it may not be cost effective to use a settling device to remove the very small particles because the size of the device would need to be quite large to allow the particles to have sufficient residence time in the settling device to achieve acceptable separation performance. Also, as the particles get smaller, they become less susceptible to gravity (and settling) and more prone to move randomly due to Brownian motion. The minimum particle size preferably may be selected where the steep decline in terminal velocity with particle size begins. From FIG. 2, the minimum particle size for use in a settling device is preferably about 20 microns, more preferably about 30 microns, and most preferably about 50 microns. Thus, it is preferable to remove particles having diameters below about 20 microns from any fresh catalyst batch and from the slurry while the reactor is operating to avoid accumulation of these smallest particles.

The presence of particles of the smallest sizes primarily comes from two sources: they may be present in fresh catalyst, or they may be generated during slurry bubble column reactor operation. As the slurry bubble column reactor operates, depending on the attrition resistance or structural integrity of the catalyst particles, catalyst particles may break down into smaller particles, some of which may be less than 20 microns. Particles of less than 20 microns are commonly referred to as fines, or sub-particles. It is preferable to remove these fines, as these fines can result in reduced separation efficiency of the larger particles from the slurry. Fines may be removed from fresh catalyst by sieving or other removal techniques that are well known in the art. A method for removing such fines from an operating slurry bubble column reactor is described in U.S. patent application Ser. No. 10/243,448, entitled, "Solid-Liquid Separation System," which is incorporated by reference in its entirety and is now issued as U.S. Pat. No. 6,833,078. That disclosure teaches a method for removing fines, or sub-particles, by processing a first slurry stream from a slurry bubble column reactor through a first separation unit. The first separation unit produces a sub-particle rich slurry that is not returned to the slurry bubble column and a sub-particle lean slurry that is returned to the slurry bubble column. A second slurry stream may be withdrawn from the reactor for removing substantially all of the catalyst particles in a second separation unit to produce a liquid product. The catalyst particles are returned to the reactor in a more concentrated slurry. The separate removal of the fines in the first separation unit allows the second separation unit to operate more efficiently.

Figure 3:
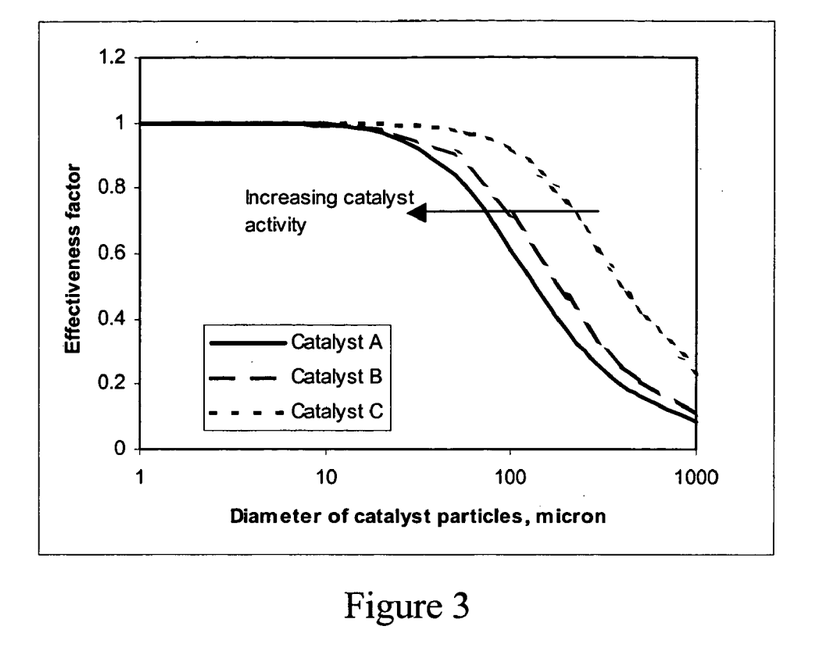
FIG. 3 is a plot illustrating the change in effectiveness factor versus catalyst particle diameter as catalyst activity increases.

On the other end of the size spectrum, it has been discovered that, in the preferred embodiment of Fischer-Tropsch synthesis, particles up to about 150 microns in diameter have an effectiveness factor of at least about 0.7, preferably of at least about 0.75, as illustrated in FIG. 3, when used with the preferred catalyst compositions set forth herein. The effectiveness factor is the portion of the catalytically active material that is actually used in promoting the reaction. Thus, if 100% of the catalytically active material is used in promoting the reaction, the effectiveness factor of the catalyst is 1. For a catalyst with a given reaction rate, the effectiveness factor decreases with increasing particle diameter. As catalyst particle size is increased, any catalytically active material that is within the catalyst becomes hindered by the time necessary for reactants to diffuse through the particle to the active material. Thus, for a given intrinsic catalytic activity, as catalyst particle size is increased, there will be a corresponding decrease in the effectiveness factor of the catalyst particle.

FIG. 3 illustrates the effect on the effectiveness factor for a given particle size of three catalysts with different productivities of hydrocarbons with 5 carbon atoms or more ($C_{5+}$). In the example shown in FIG. 3, Catalysts A, B, and C have a $C_{5+}$ productivity of about 840, 550 and 110 grams, respectively, of $C_{5+}$ hydrocarbons per kilogram of catalyst per hour. As the activity of the catalytically active material increases from Catalyst C (lowest) to Catalyst A (highest), the effectiveness factor for a given catalyst particle size will decrease, because reactants will react before they can reach the inner portions of a catalyst particle. FIG. 3 then illustrates the resulting shift in the relationship between effectiveness factor and catalyst particle size for varying catalyst activities. As the catalyst activity increases, the same size particle will produce a less effective catalyst due to increased mass transfer limitation. Additionally, larger particles are more difficult to fluidize in a slurry bubble column reactor. Therefore, large catalyst particles (i.e., those above about 200 microns, more preferably above about 150 microns in the preferred embodiment of the Fischer-Tropsch reaction) are disfavored because they represent a less effective use of, often expensive, catalytically active material.

Based on the foregoing, in the preferred embodiment of the Fischer-Tropsch reaction, catalyst particles in the range of 10 to 250 microns are preferred for slurry bubble column operation. Catalyst particles in the range of 10 to 200 microns are more preferred, and particles in the range of 20 to 150 microns are highly preferred. In order to eliminate particles outside this range, fresh catalysts—i.e., catalysts that have not been used—may be processed through sieves or other mechanical means for separating out substantially all particles outside these boundaries. For operating slurry bubble column reactors, the method described above may be used in which a first separation unit removes particles below a predetermined size to maintain a proper catalyst size distribution. Catalyst particle sizes larger than those desired generally will not form in an operating slurry bubble column reactor; thus, generally no removal technique for such particles in an operating reactor is necessary.

Figure 4A:
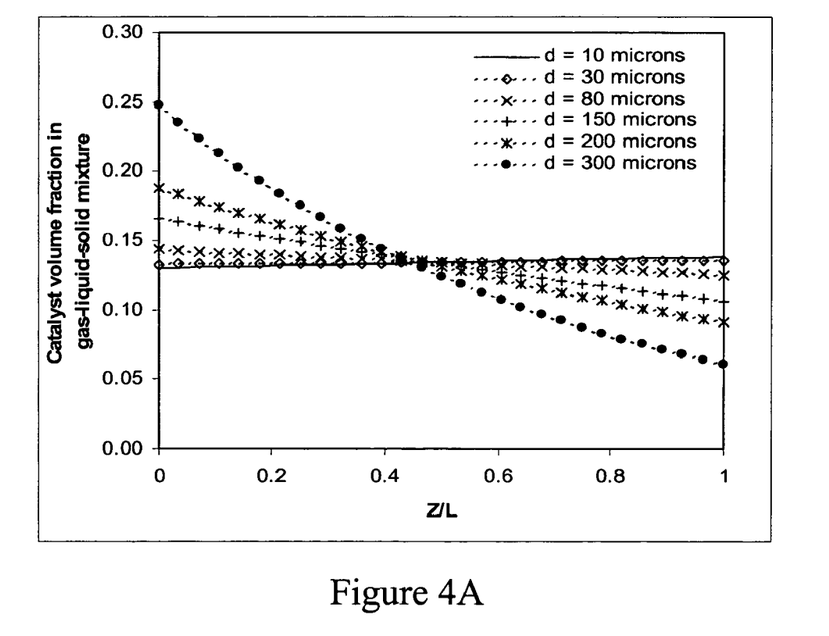
FIGS. 4A–C are plots illustrating the variation in catalyst volume fraction over the height of a vertical reactor at various catalyst particle sizes and at catalyst particle densities of 1,000 kg/m$^3$; 2,000 kg/m$^3$; and 4,000 kg/m$^3$, respectively.
Figure 4B:
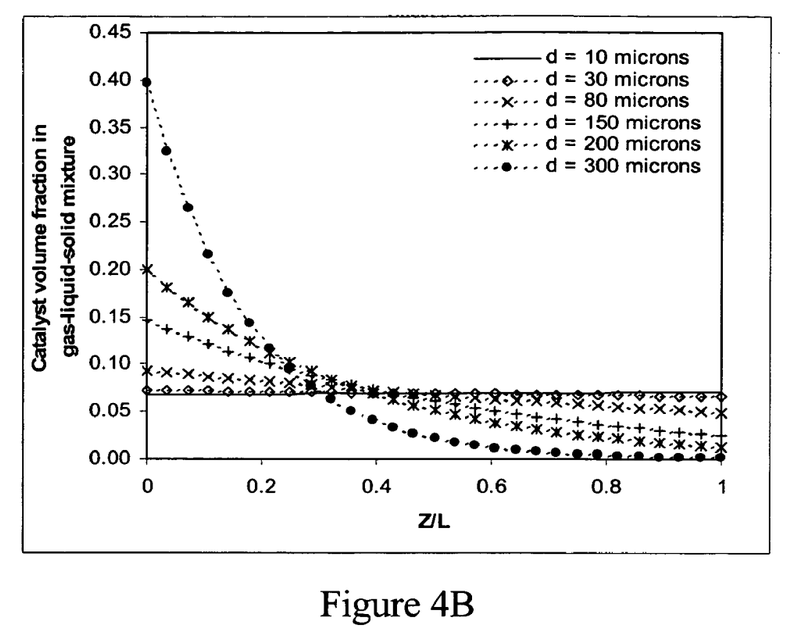
Figure 4C:
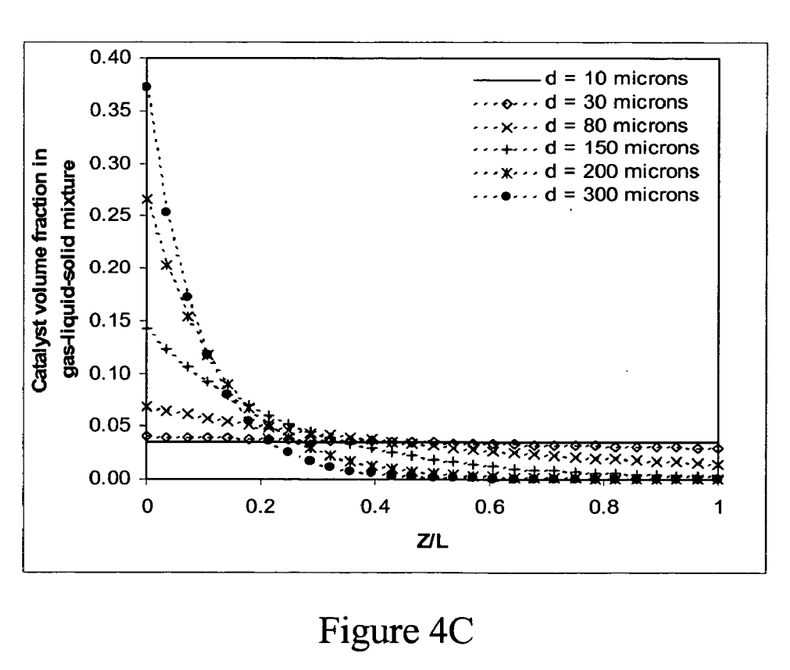

While considerations related to separation of catalyst particles from a slurry and maximizing effectiveness factor may help determine the preferred particle size range for a reactor system, other considerations may also contribute to optimizing the catalyst particle size range. Reactors with a dynamic operating environment may develop non-uniform distributions of catalyst, liquid, and/or vapor internally, such that some efficiency of the reactor volume is lost. Non-uniform substance distributions may result in non-uniform temperature distributions, which may cause operational problems, especially in highly exothermic reactions. Minimizing non-uniformity, therefore, may help improve reactor productivity and minimize operating cost and upsets of reactors. For example, FIG. 4A is a graphical depiction of the variation in catalyst volume fraction over the height of a reactor for numerous particle sizes and at a particle density of 1,000 kg/m$^3$. As can be seen from the graph, as particle size increases, the variation in catalyst volume fraction over the height of the reactor obtained at a constant gas flow rate becomes more pronounced. FIG. 4B similarly depicts the variation in catalyst volume fraction over the height of a reactor assuming a catalyst particle density of 2,000 kg/m$^3$. FIG. 4C illustrates the same relationship at a catalyst particle density of 4,000 kg/m$^3$. The catalyst non-uniformity in a slurry bed reactor system may be defined as shown in equation (1), where NU is the catalyst non-uniformity, $v_{cmax}$ is the maximum catalyst volume fraction, $v_{cmin}$ is the minimum catalyst volume fraction, and $v_{cavg}$ is the average catalyst volume fraction.

$$NU = \frac{|v_{cmax} - v_{cmin}|}{v_{cavg}} \quad (1)$$

Catalyst non-uniformity describes the variation in the volume fraction of catalyst particles over the height of a reactor.

Figure 5:
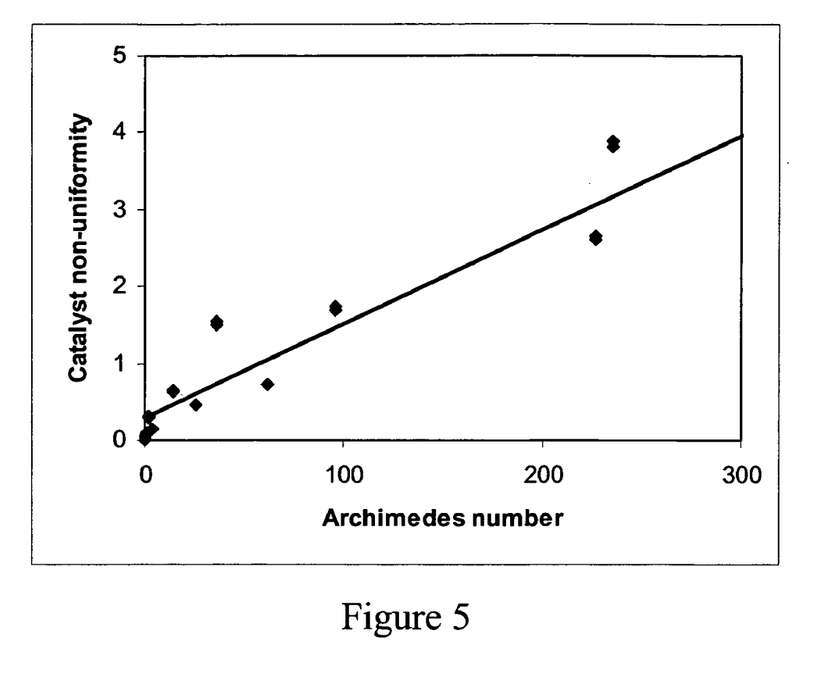
FIG. 5 is a plot of catalyst non-uniformity versus Archimedes number.

FIG. 5 shows catalyst non-uniformity plotted against the Archimedes number, Ar. The Archimedes number is a dimensionless number that is essentially the ratio of gravitational force to viscous resistance force. It may be considered a measure of the settling ability of a solid particle in a liquid environment. The Archimedes number is defined by equation (2) below, where g is the gravitational constant, $d_p$ is the particle diameter, $\rho_p$ is the particle density, $\rho_L$ is the liquid density, and $\mu_L$ is the liquid viscosity.

$$Ar = \frac{g d_p^3 (\rho_p - \rho_L) \rho_L}{\mu_L^2} \quad (2)$$

As can be seen from FIG. 5, the catalyst non-uniformity is directly proportional to the Archimedes number. Therefore, the Archimedes number may be used to predict catalyst non-uniformity. Further, minimizing the Archimedes number may also minimize the catalyst non-uniformity in a reactor.

Based on FIG. 5, an acceptable upper limit of catalyst non-uniformity may be selected and translated into an acceptable upper Archimedes number limit. The Archimedes number may then be converted into an acceptable particle diameter for a system with known particle density and liquid density and viscosity as shown in equation (3) below.

$$d_P = \sqrt[3]{\frac{Ar\mu_L^2}{g\rho_L(\rho_P - \rho_L)}} \quad (3)$$

The maximum acceptable quantity of non-uniformity may be based on operating considerations, such as the acceptable amount of temperature variation in a reactor. The catalyst non-uniformity is preferably less than 4, more preferably less than 3, and most preferably less than 2. As can be seen from FIG. 5, a catalyst non-uniformity of less than 4 would indicate an Archimedes number of less than about 300. A catalyst non-uniformity of less than 3 would indicate an Archimedes number of less than about 200, and a non-uniformity of less than 2 would indicate an Archimedes number of less than about 100.

Based on the foregoing Archimedes numbers and the physical properties of the system, a maximum particle diameter can be calculated from equation (3). For example, assuming for purposes of calculation and not by way of limitation that the catalyst particle density is 2000 kg/m³, the liquid density is 700 kg/m³, and the liquid viscosity is 0.0006 kg/m·s, the preferred particle diameter to achieve a catalyst non-uniformity of less than 2 will be about 160 microns. Other conditions being the same, if the catalyst particle density is 3.000 kg/m³, the preferred maximum particle diameter to maintain a catalyst non-uniformity of less than 2 will be about 130 microns. Thus, the preferred maximum particle diameter may change based on the properties of the particular system. However, with the embodiment of the present invention, it is possible to determine the optimum upper catalyst particle size limit based on the specific system and the specific quantity of non-uniformity desired.

Figure 6:
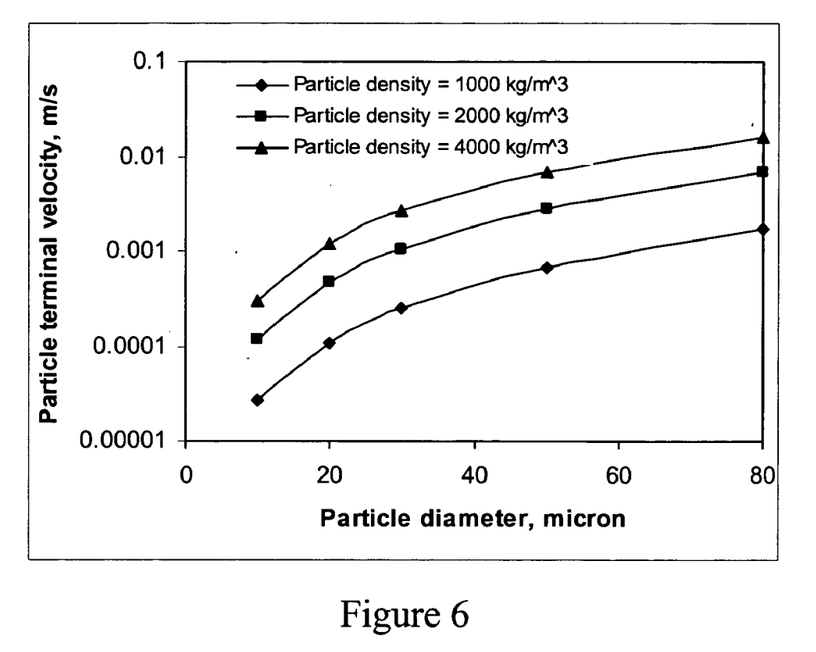
FIG. 6 is a plot of catalyst particle terminal velocity versus particle diameter at three different particle densities.

The Archimedes number may also be useful in determining a minimum catalyst particle size. As the catalyst particle size decreases, the terminal velocity decreases as well. However, the particle terminal velocity is also a function of other factors in the system, such as liquid density and viscosity. Thus, the Archimedes number may provide a useful criterion for determining the optimum minimum catalyst particle size for a given system. FIG. 6 shows particle terminal velocity versus particle diameter at three different particle densities. The data are calculated using the above-described physical properties: liquid density of 700 kg/m³ and liquid viscosity of 0.0006 kg/m·s. From these data, a dimensionless particle terminal velocity may be calculated using a reference terminal velocity. By way of example and not by way of limitation, the terminal velocity of a particle having a density of 2,000 kg/m³ and a diameter of 50 microns may be used. The dimensionless particle terminal velocity may be the ratio of the calculated particle terminal velocity to the reference particle terminal velocity.

Figure 7:
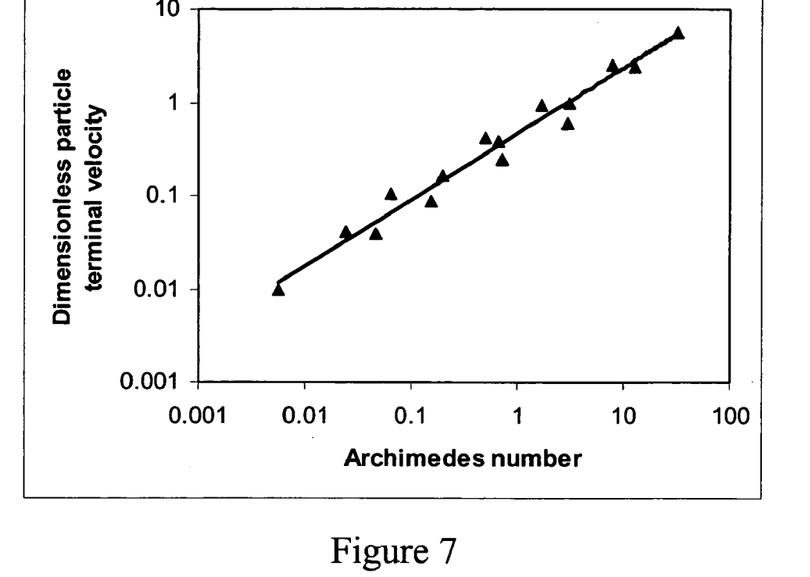
FIG. 7 is a plot of the dimensionless particle terminal velocity (a given particle terminal velocity divided by a reference particle terminal velocity) versus Archimedes number.

The dimensionless particle terminal velocity (calculated using the above assumptions) is directly proportional to the Archimedes number as shown in FIG. 7. FIG. 7 may be used to convert a desired terminal velocity into a lower Archimedes number limit. From the lower Archimedes number limit, a lower particle diameter limit may be calculated according to equation (3) above. Thus, the Archimedes number may be useful for calculating upper and lower particle diameter limitations for a given reactor system. This embodiment of the present invention provides an improved method for selecting catalyst particle size ranges for operation in slurry bubble column reactors. However, the present invention is not limited to this embodiment.

Additionally, selected ranges of Archimedes numbers may be desired. For example, the Archimedes is preferably maintained between about 0.02 and about 250. More preferably, the catalyst Archimedes number for a catalyst is between about 0.02 and about 100. Still more preferably, the catalyst Archimedes number is between about 0.2 and about 30. However, it is not necessary that the Archimedes number for all catalyst particles falls within this range. For example, it may be sufficient that a majority of catalyst particles falls within the desired range, but preferably at least about 80% by weight, more preferably at least about 90% by weight of the particles have Archimedes numbers within the desired range.

Number Average Particle Size

Particle size range is only one important aspect of particle size. The distribution of the particles within these boundaries may be more important than a maximum or minimum particle size. The distribution of catalyst particles refers to how many particles there are at each size group over the range of sizes in a sample of catalyst particles. It can be thought of graphically as a plot of the particle size fraction versus catalyst particle size where the particle size fraction is defined according to equation (4).

$$f_i = \frac{n_i}{N} \quad (4)$$

where $$N = \sum_{i=1}^{M} n_i \quad (5)$$

In equations (4) and (5), M is the number of different particle size fractions, $d_i$ is a typical diameter for particle size fraction i, and $f_i$ is determined according to equation (4) by dividing the number of particles in particle size fraction i, $n_i$, by the total number of particles, N, which is determined according to equation (5).

By way of example and not by way of limitation, one method for determining $n_i$ is to count the number of particles in fraction i with a size equal to or greater than $(d_{i-1}+d_i)/2$ and less than $(d_{i+1}+d_i)/2$, except for the first fraction where $n_1$ represents the number of particles with a size less than $(d_1+d_2)/2$ and for the last fraction M where $n_M$ represents the number of particles with a size equal to or greater than $(d_{M-1}+d_M)/2$. As a non-limiting example with four particle size fractions (i.e., M=4) where $d_1$=5 microns, $d_2$=10 microns, $d_3$=25 microns, and $d_4$=50 microns, $n_1$ would be the number of particles with a size greater than 0 and less than 7.5 microns; $n_2$ would be the number of particles with a size equal to or greater than 7.5 and less than 17.5 microns; $n_3$ would be the number of particles with a size equal to or greater than 17.5 microns and less than 37.5 microns; and $n_4$ would be the number of particles with a size equal to or greater than 37.5 microns.

Figure 8:
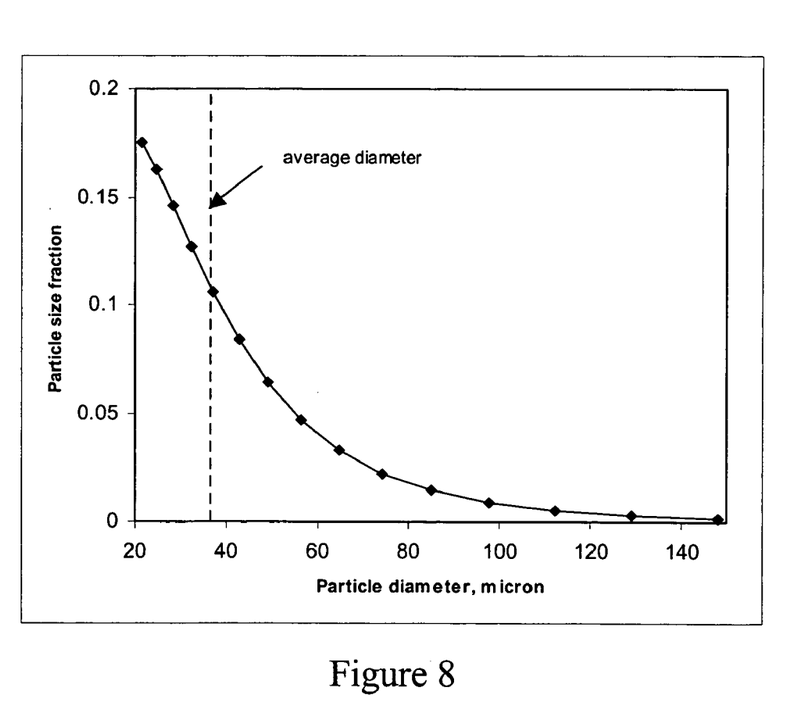
FIG. 8 is a plot of particle size fraction versus particle diameter for a given particle size distribution.

A graph of particle size fraction versus particle diameter for an actual sample of catalyst particles is shown in FIG. 8. The sample depicted in FIG. 8 is shown after particles below 20 microns and above 150 microns have been removed by sieve separation.

Because of the previously described factors that are affected by catalyst particle size, not all catalyst samples that fall substantially between about 10 and 250 microns, or more preferably substantially between about 10 and 200 microns, or most preferably substantially between about 20 and 150 microns, will perform alike. For example, in the context of the preferred embodiment of Fischer-Tropsch synthesis, it has been discovered that smaller particle sizes produce more olefins and that larger particle sizes result in lower effectiveness factors and unwanted side reactions, such as excess production of methane and/or carbon dioxide. Thus, whether the particles fall on the upper or lower end of the range of particle sizes may still affect the productivity and selectivity of the catalyst. It has been discovered that a number average particle size of about 20–50 microns is preferred, more preferably about 30–40 microns in Fischer-Tropsch synthesis. Number average particle size, $D_{avg}$, is determined according to equation (6).

$$D_{avg} = \sum_{i=1}^{M} f_i D_i \qquad (6)$$

M and $d_i$ are described earlier, and $f_i$ is determined according to equation (4).

Many of the prior art methods described above do not disclose how they calculated average particle size—e.g., U.S. Pat. Nos. 6,348,510 and 5,348,982. Nevertheless, according to convention average particle size is calculated by weight, or in a series of particles arranged from smallest to largest, the size of the next particle after half of the total series by weight has been passed over. Mathematically, one method, which is frequently used for calculating average particle size, calculates the weight median particle size (denoted typically as D[0.5]). A preferred embodiment of the present invention provides a method for improving the performance of a slurry bubble column reactor, preferably in a Fischer-Tropsch synthesis, comprising maintaining or producing a number average particle size of preferably about 20–50 microns, more preferably about 30–40 microns. Alternatively, another preferred embodiment of the present invention provides a catalyst with a number average particle size of preferably about 20–50 microns, more preferably about 30–40 microns.

The method involves maintaining a catalyst within the parameters as previously described. First, the catalyst particle sizes, in the preferred Fischer-Tropsch reaction, preferably are maintained substantially between about 10 and about 250 microns, more preferably substantially between about 10 and about 200 microns, and most preferably substantially between about 20 and about 150 microns. Other upper and lower limits of the particle size range may be selected as described above based on catalyst non-uniformity, Archimedes number, effectiveness factor, and/or separation parameters. Second, the number average particle size is maintained at about 20–50 microns, more preferably about 30–40 microns.

In another embodiment, a method is provided for producing a catalyst wherein the catalyst is produced with catalyst particle sizes substantially between about 10 and about 250 microns, more preferably substantially between about 10 and about 200 microns, and most preferably substantially between about 20 and about 150 microns. Also, the method for producing a catalyst provides a catalyst with a number average particle size of about 20–50 microns, more preferably about 30–40 microns. In yet another embodiment, the present invention provides a catalyst with particles substantially between about 10 and about 250 microns, more preferably substantially between about 10 and about 200 microns, and most preferably substantially between about 20 and about 150 microns, and with a number average particle size of about 20–50 microns, more preferably about 30–40 microns. The catalyst of these embodiments may contain the compositions disclosed above or may contain other compositions.

Log Normal Distribution

Figure 9:
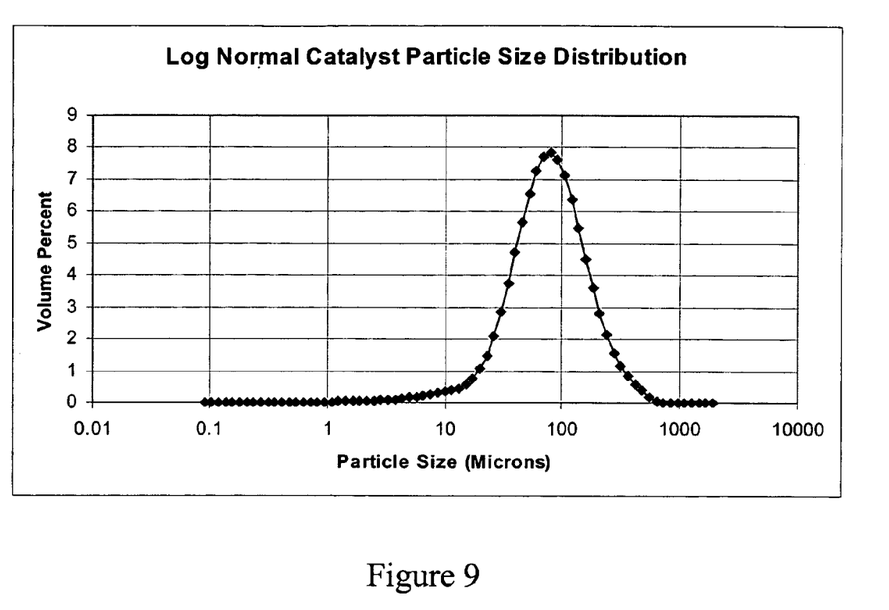
FIG. 9 is a plot of a log normal distribution of number of volume percent of catalyst particles versus size.

While number average particle size ties down the midpoint of the catalyst particle size distribution, the shape of the curve on both sides of that midpoint is another important feature of the distribution. It has been discovered that a substantially log normal distribution of catalyst particles based on the volume fraction of catalyst particles of a given particle size range is preferred. Thus, a further improvement of the present invention is a method for improving the operation of a slurry bubble column reactor by maintaining a catalyst with particle sizes that substantially approximate a log normal distribution. While an exact replication of a log normal distribution is not necessary, the closer the approximation, the more effective the catalyst. FIG. 9 shows a log normal distribution of volume percent of catalyst particles versus catalyst particle size with a midpoint at a volume weighted mean particle size. Several average particle sizes have been estimated and shown in Table 1, below, for a log normal distribution as shown in FIG. 9. The characteristic average sizes for the catalyst particle distribution as shown in FIG. 9 are a volume weighted mean particle size of about 92 microns (μm), a number averaged particle diameter of about 2 microns, a weight median diameter of about 72 microns, and a surface weighted mean diameter of about 44 microns. It is important to note that the number averaged particle size (2 microns) of this catalyst would be lower than the volume weighted mean particle size reported because the smaller particle size ranges represent more particles.

It should be apparent that either end of the distribution shown in FIG. 9 may be cut off depending on the particular range of particle sizes desired. It is anticipated by the Applicants, that the adjusted distribution, if particles below 20 microns were removed, would still contain some small amount of particles below 20 microns because in actual practice any removal technology is unlikely to be entirely successful at removing all particles outside a predetermined range. Although there will be some change from the log normal distribution based on the removal of particles below 20 microns in size, the remaining distribution of catalyst particles will still exhibit a substantially log normal distribution.

After sieving out particles larger than about 150 microns and smaller than about 20 microns, according to a preferred embodiment of this invention, Table 1 shows that the catalyst particle distribution after sieving would now have a volume weighted mean particle size of about 68 microns, a number averaged particle diameter of about 36 microns, a weight median diameter of about 67 microns, and a surface weighted mean diameter of about 54 microns.

TABLE 1

|  | Log normal distribution | Log normal distribution (20 μm–150 μm) |
| --- | --- | --- |
| Number averaged particle diameter | 2 | 36 |
| Weight median diameter D[0.5] | 72 | 67 |
| Volume weighted mean diameter D[3.4] | 92 | 68 |
| Surface weighted mean diameter D[3.2] | 44 | 54 |

Catalysts and/or catalyst supports according to the present invention may be produced using a variety of known techniques and simply sieved to produce a catalyst and/or catalyst support within the maximum and minimum particle sizes previously discussed. However, using conventional spray-drying techniques, support or catalyst particles having a log normal size distribution can be generated. Therefore, the preferred method for generating catalysts and/or catalyst supports according to the present invention is by spray-drying. Crushing catalysts after formation tends to produce an unpredictable distribution rather than the preferred log normal distribution. In addition, spray-drying permits increased control over particle sizes and distributions as is known in the art. For example, distributions of spray-dried catalyst particles and/or catalyst support particles may be controlled by regulating the concentration of solids sent to the spray drier, by changing the type and/or size of spray drier, or by changing the size of the spray drier nozzle as is well known in the art.

The size distribution of fresh catalyst particles is preferably such that about 80 percent of particles have diameters between about 10 and about 250 microns, more preferably between about 10 and about 200 microns, and most preferably between about 20 and about 150 microns. If the particles do have a log normal size distribution, such as when spray-dried particles are used "as is," the number average particle size for the most preferred size distribution range between about 20 and 150 microns will be about 30 to about 40 microns. At the same time, it may be desirable to process the particles so as to adjust and/or narrow the size distribution. Alternatively, the particles could be screened to provide a higher percentage of particles between 20 and 150 microns.

Average Reynolds Number

Various considerations about the size of the catalyst particles and the distribution of the catalyst particles have been discussed. The size and distribution of the particles are important for effective use of the catalyst and for effective fluidization of the bed in a slurry bubble column reactor. Larger particles are more difficult to fluidize because their terminal velocity is higher, requiring a higher liquid velocity to keep them distributed within the reactor. Upward liquid velocity is generated by upward gas velocity in slurry bubble column reactors; thus, higher gas velocities are required to generate higher liquid velocities. The dimensionless Reynolds number is an important criterion for predicting the fluid dynamic regime in which the catalyst particles will be operating. The Reynolds number of a given particle suspended in the liquid phase, $Re_P$, is conventionally calculated according to equation (7), where $\rho_l$ is the density of the liquid phase, $v$ is the relative velocity between the particle and the liquid phase, $D_p$ is the particle diameter, and $\mu_l$ is the liquid phase viscosity.

$$Re_p = \frac{\rho_l v D_p}{\mu_l} \quad (7)$$

Conventional techniques for predicting the flow regime use an average particle diameter as $D_p$ in equation (7) to determine the average Reynolds number. The average particle diameter most frequently used is the weight median particle diameter (i.e., D[0.5]) as previously discussed. However a particle Reynolds number calculated based on a weight median particle diameter does not represent the actual particle movement under operating conditions. A more accurate prediction of average particle Reynolds number is necessary to properly account for the actual particle size distribution based on numbers of particles.

Thus, a preferred embodiment of the present invention uses a particle number weighted average Reynolds number according to the formula in equation (7), where $f_i$ is the fraction of particles of size fraction i from equation (4), $Re_i$ is the Reynolds number of particles of size fraction i as shown in equation (9), and M is the number of particle size fractions.

$$Re_{avg} = \sum_{i=1}^{M} f_i Re_i \quad (8)$$

$$Re_i = \frac{\rho_l v D_i}{\mu_l} \quad (9)$$

$D_i$ in equation (9) represents the characteristic particle size of fraction i, defined as the half-way point between the size limits which define the fraction i (for example, a fraction size comprising particles of size between 25 and 50 microns would have a characteristic size of 37.5 microns). This Reynolds number definition according to equation (8) is the preferred criterion for defining catalyst particles according to certain embodiments of the present invention. In particular, catalyst particle distributions having an average Reynolds number, $Re_{avg}$, according to equation (8) of less than about 0.1 are preferred, more preferably about 0.05–0.06. The average Reynolds number of equation (8) is different than frequently used average Reynolds numbers in that "average Reynolds" numbers are generally single calculations using equation (7) above, where $D_p$ is a weight median particle size as previously discussed. Thus, the Reynolds number of equation (8) provides a better description of what is actually occurring in the reaction for a given catalyst distribution than previously used techniques based on equation (7). Based on the Reynolds number of equation (8), the particle size fraction of equation (4), and the average diameter of equation (6), it is has been discovered that it is important in analyzing a catalyst system to characterize the particles by size.

Any conventional method may be used for determining the quantities of particles in each size range. For the experimental data presented above, a Mastersizer 2000 analyzer from Malvern instruments (Malvern, U.K.) was used. The analyzer provides the volume fraction of each particle size range. From the volume fraction, the mass of the particles of a given size range is calculated by multiplying the volume times the bulk density of particles of that size range, which can be measured. The number of particles can be determined by dividing the mass of the particular size range of particles by the mass per particle in that size range. Mass per particle is determined by calculating the volume of a particle, assuming a spherical shape, and multiplying by the particle density. Other analyzers are available, and any method for determining the number of particles in various size ranges across the range of sizes in the sample is sufficient. The number of different particle size fractions is preferably at least five or more particle size fractions.

Definitions

As used herein, the effectiveness factor, η, is given for a spherical particle as:

$$\eta = \frac{3}{\Phi}\left(\frac{1}{\tanh\Phi} - \frac{1}{\Phi}\right) \quad (11)$$

where the simplified Thiele modulus, $\Phi$, is defined as:

$$\Phi = \frac{d_p}{2}\sqrt{\frac{k}{D_e}} \quad (12)$$

where the effective diffusivity of CO, $D_e$, and the pseudo first order rate constant for CO, k, are defined as follows:

$$D_e = D_L \frac{\varepsilon}{\tau}, \text{ and} \quad (13)$$

$$k = (r_{ft} + r_{mth})\frac{\delta}{C_L}; \quad (14)$$

where $D_L$ is the diffusivity of CO in the reactor liquid phase, $\varepsilon$ is the catalyst porosity, $\tau$ is the catalyst tortuosity, $\delta$ is a conversion term from rate based on weight of active component to rate based on unit reactor volume;

$C_L$ is the liquid concentration of CO;

$r_{ft}$, the reaction rate for Fischer-Tropsch synthesis, is given by:

$$r_{ft} = \frac{1}{4-\alpha}(r_{SYN} - 4r_{MTH}); \quad (15)$$

where the kinetic expression for the syngas ($H_2$+CO), $r_{SYN}$, is given according to Yates and Satterfield (Energy & Fuels, 5, 168, 1991) as, $$r_{SYN} = k_{SYN}e^{-E_{syn}/RT}\frac{C_{CO}C_{H2}}{(1+b_{SYN}C_{CO})^2}, \text{ and} \quad (16)$$

where the kinetic expression for the methanation, $r_{MTH}$, is given according to Agrawal et al. (Journal of Catalysis, 69, 312, 1981) as, $$r_{MTH} = k_{MTH}e^{-E_{MTH}/RT}\frac{C_{CO}C_{H2}^{0.5}}{(1+b_{MTH}C_{CO})^2} \quad (17)$$

where $C_{CO}$ and $C_{H2}$ are the concentrations of CO and $H_2$ in the liquid phase, respectively, and $\alpha$ is the Schulz-Flory chain growth probability characterizing the distribution of Fischer-Tropsch products.

As used herein, the weight median diameter is defined as the particle size for which 50% of the total weight of a cumulative distribution curve of the particle sizes comprises particles of sizes above this weight median diameter and 50% of the total weight comprises particles of sizes below this weight median diameter.

As used herein, the number average particle size, $D_{avg}$, is determined according to equation (6).

$$D_{avg} = \sum_{i=1}^{N} f_i d_i \quad (6)$$

where relative frequency of particles of size i, $f_i$, is determined by dividing the number of particles of size i, $n_i$, by the total number of particles, N:

$$f_i = \frac{n_i}{N} \quad (4)$$

As used herein, the volume weighted mean diameter, $d_V$ (commonly denoted as D[4,3]), is as:

$$d_V = \frac{\sum f_i d_i^4}{\sum f_i d_i^3} \quad (18)$$

As used herein, the surface weighted mean diameter, $d_S$ (commonly denoted as D[3,2]), is as:

$$d_S = \frac{\sum f_i d_i^3}{\sum f_i d_i^2} \quad (19)$$

While the preferred embodiments of the invention have been shown and described, modifications thereof can be made by one skilled in the art without departing from the spirit and teachings of the invention. The embodiments described herein are exemplary only and are not intended to be limiting. Many variations and modifications of the invention disclosed herein are possible and are within the scope of the invention. The disclosures of all patents, patent applications, and publications cited above are incorporated herein by reference.

The invention claimed is:

1. A method for producing hydrocarbons from synthesis gas in a slurry bubble reactor, the slurry bubble reactor including a liquid and a catalyst at conversion promoting conditions, wherein the liquid has a density, $\rho_L$, and viscosity, $\mu_L$, under said conversion promoting conditions and wherein the catalyst comprises a plurality of catalyst particles including fresh catalyst particles, the fresh catalyst particles having a particle density, $\rho_P$, and particle sizes, $d_P$, the method comprising the steps of:
(a) selecting the fresh catalyst particles such that the fresh catalyst particles have Archimedes numbers between about 0.02 and about 250, the Archimedes numbers being defined by $Ar=gd_P^3\rho_L(\rho_P-\rho_L)/\mu_L^2$; and
(b) passing a synthesis gas feed stream in said slurry bubble reactor over said catalyst under said conversion promoting conditions to convert at least a portion of said synthesis gas feed stream to hydrocarbons.

2. The method of claim 1, wherein a majority of said catalyst particles have particle sizes between about 10 and about 250 microns.

3. The method of claim 2, wherein the catalyst has an effectiveness factor in step (b) greater than about 0.7.

4. The method of claim 2, wherein the catalyst particles have an average Reynolds number of less than about 0.1, according to the equation $$Re_{avg} = \sum_{i=1}^{M} f_i Re_i,$$

where M is the number of different particle size fractions; $f_i$ is the portion of particles in particle size fraction i, which is determined by dividing the number $n_i$ of particles in size fraction i by the total number N of particles, which is determined according to $$N = \sum_{i=1}^{M} n_i;$$

and $Re_i$ is the Reynolds number of particles of size fraction i, $Re_i$ being defined according to the equation $$Re_i = \frac{\rho_l v D_i}{\mu_l},$$

where $D_i$ is the number average particle size of particles in size fraction i.

5. The method of claim 1, wherein the fresh catalyst particles have Archimedes numbers between about 0.02 and about 100.

6. The method of claim 1, wherein the fresh catalyst particles have Archimedes numbers between about 0.2 and about 30.

7. The method of claim 1, wherein at least about 90 percent by weight of the catalyst particles have an Archimedes number between about 0.02 and about 100.

8. A process for producing hydrocarbons from synthesis gas in a slurry bubble reactor, the slurry bubble reactor including a liquid and a catalyst at conversion promoting conditions, wherein the liquid has a density, $\rho_l$, and viscosity, $\mu_l$, under said conversion promoting conditions and wherein the catalyst comprises a plurality of catalyst particles including fresh catalyst particles with a particle velocity, v, the method comprising the steps of:
(a) selecting the fresh catalyst particles such that the fresh catalyst particles have Archimedes between about 0.02 and about 250, the Archimedes numbers being defined by $Ar=gd_P^3\rho_{L(}\rho_P-\rho_L)/\mu_L^2$; and further selecting the catalyst particles such that the catalyst particles have an average Reynolds number of less than about 0.1, according to the equation $$Re_{avg} = \sum_{i=1}^{M} f_i Re_i,$$

wherein M is the number of different particle size fractions; $f_i$ is the portion of particles in particle size fraction, which is determined by dividing the number $n_i$ of particles of size fraction i by the total number N of particles, said N being determined according to $$N = \sum_{i=1}^{M} n_i;$$

and $Re_i$ is the Reynolds number of particles of size fraction i; $Re_i$ being defined according to the equation $$Re_i = \frac{\rho_l v D_i}{\mu_l},$$

where $D_i$ is the number average particle size of particles in size fraction i; and
(b) passing a synthesis gas feed stream in said slurry bubble reactor over said catalyst under said conversion promoting conditions to convert at least a portion of said synthesis gas feed stream to hydrocarbons.

9. The process according to claim 8 wherein the number average particle size is between about 20 and about 50 microns.

10. The process according to claim 9 wherein the number average particle size is between about 30 and about 40 microns.

11. The process according to claim 9, wherein the catalyst has an effectiveness factor in step (b) greater than about 0.7.

12. The process according to claim 8 wherein at least 90% of the plurality of particles have sizes between about 20 and about 150 microns.

13. The process according to claim 8 wherein the plurality of particles comprise a substantially log normal distribution of volume percent of catalyst particles versus particle sizes.

14. The process according to claim 8 wherein the plurality of particles have an average Reynolds number of between about 0.05 and about 0.06.

15. The process according to claim 1 wherein the catalyst comprises a number average particle size between about 20 and about 50 microns.

16. The process according to claim 1 wherein the catalyst comprises a number average particle size between about 30 and about 40 microns.

17. The process according to claim 1 wherein at least 90% of the plurality of particles have sizes between about 20 and about 150 microns.

18. The process according to claim 4 wherein the plurality of particles have an average Reynolds number of between about 0.05 and about 0.06.

19. A method for producing hydrocarbons from synthesis gas in a slurry bubble reactor, the slurry bubble reactor including a liquid and a catalyst at conversion promoting conditions, wherein the liquid has a density, $\rho_L$, and viscosity, $\mu_L$, under said conversion promoting conditions and wherein the catalyst comprises a plurality of catalyst particles Including fresh catalyst particles, the fresh catalyst particles having a particle density, $\rho_P$, and particle sizes, $d_P$, the method comprising the steps of:
(a) selecting the fresh catalyst particles such that the fresh catalyst particles have Archimedes numbers between about 0.02 and about 250, the Archimedes numbers being defined by $Ar = g d_P^3 \rho_L (\rho_P - \rho_L)/\mu_L^2$; and
(b) passing a synthesis gas feed stream in said slurry bubble reactor over said catalyst under said conversion promoting conditions to convert at least a portion of said synthesis gas feed stream to hydrocarbons, while maintaining a catalyst non-uniformity in said reactor of less than 4.

20. The process of claim 19, wherein the catalyst non-uniformity is less than about 3.

21. The process of claim 19, wherein the catalyst non-uniformity is less than about 2.

22. The process of claim 19, wherein the fresh catalyst particles have Archimedes numbers between about 0.02 and about 100.

23. The process of claim 19, wherein the fresh catalyst particles have Archimedes numbers between about 0.2 and about 30.

24. The process of claim 19, wherein at least about 90 percent by weight of the catalyst particles in said reactor have an Archimedes number between about 0.02 and about 100.

* * * * *